United States Patent [19]

Skaggs et al.

[11] Patent Number: 5,951,910
[45] Date of Patent: Sep. 14, 1999

[54] RETICULATED BACTERIAL CELLULOSE AS A RHEOLOGICAL MODIFIER FOR POLYOL FLUID COMPOSITIONS

[75] Inventors: C. Bryan Skaggs, San Diego; Thomas R. Sifferman, El Cajon; John M. Swazey, San Diego; Harold D. Dial, El Cajon; Walter G. Rakitsky, San Diego, all of Calif.

[73] Assignee: Monsanto Company, St. Louis, Mo.

[21] Appl. No.: 09/040,136

[22] Filed: Mar. 17, 1998

Related U.S. Application Data

[63] Continuation-in-part of application No. 08/819,655, Mar. 17, 1997, abandoned.

[51] Int. Cl.$^6$ .............................. C09K 3/18; C09K 3/00; C09K 5/00; C09K 7/06
[52] U.S. Cl. .......................... 252/70; 106/13; 106/203.1; 106/203.2; 252/62; 252/315.3; 435/252.1; 435/823; 507/101; 507/112; 507/139; 507/201; 507/214; 507/266; 536/56
[58] Field of Search ................................. 106/13, 203.1, 106/203.2; 252/62, 70, 315.3; 435/252.1, 823; 536/56; 507/101, 112, 139, 201, 214, 266

[56] References Cited

U.S. PATENT DOCUMENTS

| | | | |
|---|---|---|---|
| 4,863,565 | 9/1989 | Johnson et al. | 162/150 |
| 5,009,797 | 4/1991 | Penny et al. | 252/8.551 |
| 5,079,162 | 1/1992 | Ben-Bassat et al. | 435/252.1 |
| 5,144,021 | 9/1992 | Arie et al. | 536/56 |
| 5,228,900 | 7/1993 | Stephens et al. | 75/303 |
| 5,290,768 | 3/1994 | Ramsay et al. | 514/54 |
| 5,290,830 | 3/1994 | Tung et al. | 524/35 |
| 5,350,528 | 9/1994 | Westland et al. | 252/8.551 |
| 5,362,713 | 11/1994 | Westland et al. | 507/110 |
| 5,366,750 | 11/1994 | Morano | 426/572 |
| 5,620,947 | 4/1997 | Elward-Berry | 507/229 |
| 5,637,197 | 6/1997 | Watt et al. | 162/202 |

FOREIGN PATENT DOCUMENTS

| | | |
|---|---|---|
| 0058917 | 9/1982 | European Pat. Off. . |
| 92/22621 | 12/1992 | WIPO . |
| 93/11182 | 6/1993 | WIPO . |
| 96/40423 | 12/1996 | WIPO . |
| 97/10313 | 3/1997 | WIPO . |
| 98/06792 | 2/1998 | WIPO . |

OTHER PUBLICATIONS

Chemical Abstract No. 115:258508 which is an abstract of an article by Debzi et al entitled "The alpha . . . cellulose . . . various mediums", Macromolecules (1991), 24(26). No Month.

Chemical Abstract No. 124:4843 which is an abstract of an article by Toyosake et al entitled "The characterization . . . acetobacter . . . subsp. nov.", J. Gen. Appl. Microbiol. (1995), 41(4). No Month.

WPIDS Abstract No. 84–240638 which is an abstract of Japanese Patent Specification No. 59–143587 (Aug. 1984).

WPIDS Abstract No. 89–232132 which is an abstract of Japanese Patent Specification No. 01–168289 (Jul. 1989).

WPIDS Abstract No. 91–047910 which is an abstract of Japanese Patent Specification No. 03–000069 (Jan. 1991).

WPIDS Abstract No. 96–094100 which is an abstract of Japanese Patent Specification No. 08–003018 (Jan. 1996).

WPIDS Abstract No. 97–328484 which is an abstract of Japanese Patent Specification No. 09–132601 (May 1997).

E.M. Debzi et al., "The Id IB Transformation of Highly Crystalline Cellulose by Annealing in Various Mediums," *Macromolecules,* 24, 6816–6822 (1991). No Month.

*Primary Examiner*—Anthony J Green
*Attorney, Agent, or Firm*—Fitzpatrick, Cella, Harper & Scinto

[57] ABSTRACT

Rheologically modified compositions, and rheologically modified fluid compositions prepared therefrom, containing reticulated bacterial cellulose in a polyol base fluid, are disclosed. The amount of reticulated bacterial cellulose present in the composition is an amount effective to viscosify the polyol base fluid.

16 Claims, No Drawings

RETICULATED BACTERIAL CELLULOSE AS A RHEOLOGICAL MODIFIER FOR POLYOL FLUID COMPOSITIONS

CROSS-REFERENCE TO RELATED APPLICATIONS

This application is a continuation-in-part of U.S. patent application Ser. No. 08/819,655, filed Mar. 17, 1997, now abandoned.

BACKGROUND OF THE INVENTION

1. Field of the Invention

This invention relates to rheologically modified polyol compositions using reticulated bacterial cellulose as the rheological modifying agent.

2. Related Background Art

Rheologically modified, or viscosified, polyol compositions have many uses. They have been used for fluid retention/sealant systems such as tire sealants, fluid drives and the like. Polyols, and polyethylene glycols in particular, are frequently added in conjunction with other components for various applications in cosmetics, for example, molded sticks (lipstick), sunscreens, astringents, shaving products including pre-shave, shave gel and cream, and aftershave. Polyols are common additives in other personal care products, such as hair fixatives, colorants, and conditioners, and are frequently used as delivery vehicles for scalp treatments. In each of these applications, the combination of polyols with a rheological modifying agent forms viscosified compositions that provide products that are easy to use and apply.

Rheologically modified polyols provide enhanced flow and cling properties to various humectants, such as in toothpaste and gels. Synthetic lubricants represent yet another application wherein the enhanced rheology of polyol base fluids build cling and sag control and prevent flow off of the lubricant. Due to the ability of the Theologically modified polyols to suspend particulates, these viscous compositions may be used as fluid delivery compositions or carriers for certain materials. Metal working fluids containing such rheologically modified polyols may be used as an aid to transport cuttings. Additionally, these fluid compositions may be used as carriers or delivery vehicles for other particulate materials, e.g., water-soluble hydrocolloids. These delivery and surface cling features are important in other applications as well, such as in varnish and paint removers and other painting applications.

Rheologically modified polyols have been used in oil field operations, e.g., in drilling fluids, workover/completion fluids, cementing fluids, oil well insulating fluids, as ballast materials, non-petroleum based hydraulic fluids, and the like.

The conveyance of oil obtained from offshore fields requires specially designed systems. Sometimes, the temperature of oil, pumped from beneath the ocean floor, is about 104°–121° C. (220°–250° F.), yet the temperature of the water through which the oil must be conveyed can be as low as 0°–10° C. (32°–50° F.). Any system for conveying oil through such a low temperature environment must provide a suitable means for insulating the oil from the low temperature of the surrounding environment.

Failure to provide adequate insulation results in reduction of the oil temperature. It is important to maintain high oil temperature to retain low viscosity and high pumpability of the oil as it is pumped through the pipeline. As the temperature decreases, the viscosity of the oil increases making it more difficult to pump. Further, at lower temperatures, separation and crystallization of the various hydrocarbon fractions present in the oil may result. For example, paraffins, low viscosity hydrocarbons, medium viscosity hydrocarbons, oil sludge, and the like, may deposit on the pipeline walls gradually restricting oil flow. Thus, the means of conveyance, typically pipelines, must be insulated to achieve efficient flow of the oil.

Ramsay, et al., U.S. Pat. No. 5,290,768, describe the use of rheologically modified welan gum/ethylene glycol compositions as insulating fluids for oil pipelines. A chelating agent, such as ethylenediamine tetraacetic acid, is present in these compositions to minimize the deleterious effects of metal ion contaminants present in pipeline pumping operations. However, an improved rheologically modified composition which serves as a thermal insulating material having long term stability at high temperatures and in the presence of metal ion contaminants, without the necessity of added chelating agents, would be highly desirable for pipeline oil insulation.

Reticulated bacterial cellulose is a useful and unique rheological modifying, or viscosifying agent. Unlike water soluble viscosifying agents, such as various polysaccharide derivatives, guar gum, welan gum, xanthan gum or sodium alginate, reticulated bacterial cellulose is a colloidal network of ultra fine cellulose fibers. This network structure differentiates the reticulated bacterial cellulose used in this invention from other polysaccharide derivatives. When the ultra fine cellulose fibers of the reticulated bacterial cellulose are dispersed in a base fluid, the colloidal network expands throughout the fluid. In this dispersed form, the reticulated bacterial cellulose is insensitive to many of the harsh conditions that adversely impact soluble polysaccharide materials, such as harsh temperatures, pH, salinity and shear.

As used herein, the term "reticulated bacterial cellulose" refers to cellulose produced by microorganisms using aerobic culturing techniques and is characterized by a highly reticulated, branching interconnected network of fibers that are insoluble in water. Reticulated bacterial cellulose may be produced by the genus Acetobacter under agitated conditions and is available, under the registered trade name Cellulon®, from the NutraSweet Kelco Company, a unit of the Monsanto Company, St. Louis, Mo.

The preparation of reticulated bacterial cellulose is well known. For example, U.S. Pat. No. 5,079,162 and U.S. Pat. No. 5,144,021, both of which are incorporated by reference herein, disclose a method and media for producing reticulated bacterial cellulose aerobically, under agitated culture conditions, using a bacterial strain of *Acetobacter aceti* var.*xylinum*. Use of agitated culture conditions results in sustained production, over an average of 70 hours, of at least 0.1 g/liter per hour of the desired cellulose. Wet cake reticulated cellulose, containing approximately 80–85% water, can be produced using the methods and conditions disclosed in the above-mentioned patents. Dry reticulated bacterial cellulose can be produced using drying techniques, such as spray-drying, drum-drying, tray-drying or freeze-drying, that are well known.

Acetobacter is characteristically a gram-negative, rod shaped bacterium 0.6–0.8 $\mu$m by 1.0–4 $\mu$m. It is a strictly aerobic organism; that is, metabolism is respiratory, never fermentative. This bacterium is further distinguished by the ability to produce multiple poly $\beta$-1,4-glucan chains, chemically identical to microcrystalline cellulose. The microcellulose chains, or microfibrils, of reticulated bacterial cellulose are synthesized at the bacterial surface, at sites external to the cell membrane. These microfibrils generally have cross sectional dimensions of about 1.6 nm×5.8 nm. Due to the small particle diameter, the microfibrils have a surface area several orders of magnitude higher than normal wood cellulose. It is this extremely high surface area that is responsible for many of the unique functional properties (viscosity, yield stress, binding properties etc.) of reticulated bacterial cellulose.

Aqueous rheologically modified compositions containing reticulated bacterial cellulose compositions have been used in oil production applications. U.S. Pat. No. 5,009,797 discloses a high viscosity aqueous hydraulic fracturing fluid composed of an aqueous based mixture of reticulated bacterial cellulose and a gellant. Aqueous crosslinked fracturing fluids, demonstrating increased resistance to temperature thinning and physical shear, have also been prepared using reticulated bacterial cellulose, a gellant and a crosslinking agent, U.S. Pat. No. 5,350,528.

Methods of drilling formations, using aqueous well bore drilling muds containing reticulated bacterial cellulose, are disclosed in U.S. Pat. No. 5,362,713. The drilling muds additionally may contain water soluble polymers, such as cellulose derivatives, polyacrylamides or other polysaccharides.

Morano, U.S. Pat. No. 5,366,750, discloses edible non-aqueous thermostable compositions, containing ultrahigh surface cellulose materials, such as bacterial fermentation cellulose, that are pre-dried with a chaotropic agent, preferably corn syrup, for use as food product fillings or cremes. These compositions have an ultra-low water activity and additionally contain an edible non-aqueous hydrophilic liquid.

However, there still exists a strong need for versatile and stable rheologically modified polyol compositions useful for industrial applications. These highly desirable compositions would possess good flow properties, permitting pumping and pouring, and would enhance the value of current polyol applications.

SUMMARY OF THE INVENTION

This invention is directed to versatile and stable rheologically modified compositions containing reticulated bacterial cellulose in a polyol base fluid. The amount of reticulated bacterial cellulose present in the compositions is an amount effective to viscosify and stabilize the compositions, while permitting smooth, uniform flow, thus enabling pumping and pouring of the compositions.

The present invention is directed to rheologically modified polyol compositions, fluid compositions prepared therefrom, and methods of using these compositions as de-icing agents, anti-sag or yield point enhancing agents, drilling fluids, fluid delivery compositions, e.g. hydrocolloid delivery fluids, well bore fluids and the like.

The present invention is further directed to a method of using rheologically modified polyol compositions as a thermal insulation composition, i.e., as a pipeline insulator. The rheologically modified insulation composition of this invention is particularly suitable for maintaining relatively high oil temperature during conveyance within a pipe located in a relatively low temperature environment, such as sea water.

DETAILED DESCRIPTION OF THE INVENTION

The rheologically modified polyol compositions of this invention comprise versatile and stable dispersions of reticulated bacterial cellulose and a polyol base fluid. The polyol compositions may be prepared by mixing the reticulated bacterial cellulose with the polyol base fluid to form a homogeneous dispersion. The dispersion of reticulated bacterial cellulose in polyol may be preferably conducted using high energy mixing conditions, for example, using high shear mixing or homogenization. Apparatus that may be useful in forming the cellulose dispersion include a Gaulin homogenizer, Waring blender, or other high-shear mixers, such as those manufactured by Silverson, Ross, Greaves, and the like, or a Heidolph propeller mixer.

The amount of reticulated bacterial cellulose present in the polyol compositions is that amount required to effectively thicken the polyol base fluid, i.e., to viscosify the polyol base fluid, to a desired viscosity, which may vary depending on the intended use of the composition. These polyol compositions may be used directly, or may be used in combination with other additives to form rheologically modified fluid compositions. The rheologically modified compositions of this invention have advantageous stability and good flow properties, that is, good pumpability characteristics. These compositions are also thixotropic, and will liquefy when agitated, stirred or shaken, and then thicken when at rest. The preferable polyol compositions of this invention will form a gel structure when at rest.

The reticulated bacterial cellulose used to prepare the rheologically modified polyol compositions of this invention may be in the form of a culture medium (liquid or concentrated fiber), a wet cake, or a powder, but is preferably used as a solid, such as a wet cake or a dry powder. Although the amount of reticulated bacterial cellulose present in the polyol compositions of this invention will vary depending on the viscosity of the composition required for a specific use, the amount of cellulose typically used is about 0.005% to about 2.0% by weight of the composition.

The polyol base fluids that can be used in the rheologically modified compositions of this invention are polyhydroxyl-containing solvents, containing 2 or more hydroxyl moieties. Exemplary polyol base fluids include, but are not limited to, glycols, e.g., ethylene glycol, propylene glycol; polyglycols, e.g., polyethylene glycol, polypropylene glycol; and polyhydric alcohols, e.g. glycerine. These base fluids may be used alone or in combination with other solvents that are miscible with the base fluid, for example, water, lower alkyl alcohols, or other polyols. Commercially available polyol base fluids often contain low amounts of impurities, including water. Typically they contain less than 10% water, and preferably, less than 5% water, by weight. Accordingly, these polyol base fluids are considered to be substantially non-aqueous solvents, and the rheologically modified compositions prepared therefrom, are considered to be substantially non-aqueous rheologically modified compositions. The total amount of fluid used in the rheologically modified polyol compositions of this invention will vary depending upon the intended use of the composition. Generally, however, the total amount of fluid in the polyol compositions of this invention is about 40% to about 99.995% by weight of the composition. The amount of polyol base fluid in the polyol compositions of this invention is about 50% to about 99.995% by weight of the total amount of the fluid in the composition, and preferably about 95% to about 99.9% by weight of the total amount of the fluid in the composition.

When dispersed in the polyol base fluid, the reticulated bacterial cellulose provides a fine structure which is effective at creating yield stress. Yield stress is a measure of the force required to initiate flow in a gel-like system and represents the stress required to start fluid movement. Yield stress is indicative of the suspension ability of a fluid. The yield stress achieved by the use of the reticulated bacterial cellulose, particularly in polyol based fluids, imparts excellent stability to a variety of industrial applications. When used to prepare a thermal insulation fluid, the fine network substructure formed by the reticulated bacterial cellulose effectively prevents the formation and circulation of thermal convection currents. When used to prepare fluid carrier or delivery compositions, the fine network substructure enhances the ability of the fluid to suspend particulate materials, such as hydrocolloid particles, metal cuttings, and the like, and provides for the formation of smooth, stable suspensions of particulates that do not settle out, even on standing.

The rheologically modified polyol compositions of this invention are useful to impart enhanced cling and anti-sag properties to de-icing fluids, especially for aircraft and other machinery that needs to be kept free of ice build-up in freezing weather. The method of using a rheologically modified polyol composition as a de-icing fluid comprises applying the polyol composition by spraying, pouring, or pumping onto the surface of the object or substrate to be protected. The enhanced cling properties of the polyol composition inhibits or substantially prevents the composition from flowing off the surface of the object, thereby forming a barrier between the surface of the object and the environment. Moreover, as the object begins to move, i.e., as an airplane begins takeoff and the force of air increases against the plane, the thixotropic polyol composition liquifies and flows off the object, thereby functioning as an efficient temporary coating of the object.

The rheologically modified fluid compositions of this invention contain the rheologically modified polyol composition of this invention in combination with various additives that are typically present or required, or desirable, for specific applications. Typical additives may include the active materials of the composition or stabilizing agents that are added to prevent degradation of the composition. Because reticulated bacterial cellulose is capable of maintaining high viscosity and stability of the rheologically modified compositions in the presence of different types of additives, the compositions of this invention are advantageously useful for a wide variety of applications. Moreover, because the reticulated bacterial cellulose compositions remain stable, the compositions of this invention are useful without the addition of the stabilizing agents required for many of the prior art viscosifying agents.

In one embodiment of this invention, rheologically modified thermal insulation fluids may be prepared and used for the transport of a temperature sensitive fluid, e.g., oil, through a lower temperature environment surrounding the temperature sensitive fluid. The rheologically modified thermal insulation fluid compositions of this invention contain reticulated bacterial cellulose in a polyol base fluid, and may optionally contain co-agents, corrosion inhibitors and/or metal sequestrants (metal chelators).

The rheologically modified thermal insulation composition of this invention may be used to insulate a thermally sensitive fluid by surrounding an outer surface of a fluid transport member with the fluid composition. Generally, a fluid transport member, such as a pipe, or a collection of pipes (pipe bundles), is placed within a carrier pipe. The carrier pipe is sufficiently larger in diameter than the fluid transport member to provide an insulating chamber. Introduction of the rheologically modified thermal insulation composition of this invention into the insulating chamber surrounds or encases the fluid transport member to provide a stable and effective insulating system, which reduces the heat loss of fluid during the transporting operation (pumping of the fluid) through the fluid transport member of a pipeline. This arrangement permits the fluid transport member to be effectively insulated from the lower temperature environment.

The temperature sensitive fluid, for which the above described method is especially useful, is oil, particularly oil that is obtained from undersea oil wells. Such oil, naturally having a temperature greater than that of the sea near the ocean floor, is insulated from the lower sea temperature and retains its naturally elevated temperature as it flows through pipelines to reach the ocean surface or land based oil collection facility. The insulation capacity of the thermal insulation fluid composition is such that either longer sea bed lines or slower production rates through shorter lines is possible, while end line minimum oil temperatures are maintained.

The thermal insulation composition of this invention also aids in ballasting of pipe bundles to substantially eliminate buoyancy of the carrier pipe that might occur with an alternative insulating system. Conventional insulation materials such as extruded foams and insulation wrappings, which are low density materials, do not provide such stability.

Significantly, the thermal insulation composition of this invention is stable in the presence of cations. Cations can deleteriously impact fluids viscosified with anionic polysaccharides by cross-linking the viscosifying agent or polysaccharide material. Steel or concrete pipes, used to contain the insulation composition, serve as sources for cation contaminants. Steel pipes may introduce iron or other metal ions into the insulation composition. Concrete, used in pipes, may introduce calcium ions into the fluid. The rheologically modified thermal insulation fluid compositions of the present invention are advantageously stable in the presence of metal ions without the need of added metal sequestrants. Optionally, however, metal sequestrants (chelators) may be added to the thermal insulation composition of this invention to enhance the stability of the composition.

The rheologically modified insulation compositions of this invention possess other advantageous properties as an oil well thermal insulating material. The reticulated bacterial cellulose, in the polyol base fluid, is compatible with water and salt water. Moreover, the miscibility of the polyol base fluid in water ensures that no lasting detrimental effects to the environment will result in the event of spillage of the composition.

The amount of the reticulated bacterial cellulose present in the rheologically modified thermal insulation composition of this invention is an amount effective to viscosity the polyol base fluid to substantially reduce convection flow in the composition. Typically, the amount of the cellulose present in the fluid composition is about 0.05% to about 2%, and preferably about 0.1% to about 1%, and more preferably about 0.4% to about 0.7% by weight of the composition. The amount of polyol base fluid present in the fluid composition is about 50% to about 99.995%, and more preferably about 95% to about 99.6% by weight of the composition.

Optionally, co-agents, or dispersing agents, may be used in the thermal insulation compositions of this invention to provide enhanced inhibition of convection current formation and/or to improve the pumpability of the resulting mixtures. Co-agents useful in the present invention are typically water-soluble polymers that are capable of interacting with the surface of the reticulated bacterial cellulose in a non-covalent manner (i.e., hydrogen bonding with the cellulose). The co-agents may be used to modify the flow behavior of reticulated bacterial cellulose dispersions, act as aids for the high energy dispersion/activation process to improve activation efficiency, to prevent the possibility of flocculation and sedimentation of the cellulose, and to act as a dispersant and re-activation aid for dried materials produced from reticulated bacterial cellulose dispersions. The co-agents may be added neat or in solution. Suitable co-agents are water-soluble, cellulosic materials. Thus, the thermal insulation fluid compositions of the present invention may optionally contain sufficient amounts of water to solubilize the co-agent in the polyol base fluid. Co-agents that may be useful in the present invention include, but are not limited to, hydroxyethyl cellulose (HEC), cationic hydroxyethyl cellulose, methyl cellulose (MC), carboxymethyl cellulose (CMC), hydroxymethyl cellulose (HMC), non-ionic cellulose, hydroxypropyl cellulose (HPC), cellulose fiber (i.e., Solka-Floc®, sold by the James River Corp., Berlin, N.H.), welan gum, and xanthan gum. A preferred co-agent is carboxymethyl cellulose. If present, the amount of co-agent used in the thermal insulation composition of this invention is about 0.05% to about 1% and preferably about 0.05% to about 0.25% by weight of the composition.

Optionally, corrosion inhibitors may be present in the thermal insulation fluid of the present invention to provide enhanced stability of the pipeline/insulator system by inhibiting the deterioration of the concrete or steel pipes from constant contact with the insulation fluid composition. Corrosion inhibitors are compounds, or compositions, that will adhere to the pipe surface, forming a protective coating thereon. Corrosion inhibitors that may be useful include, but are not limited to, surfactants, e.g. N-laurylsarcosine (used as Hamposyl-O®, a product of W. R. Grace, Co.), triethanolamine, fatty diamines, phosphonates, acetylenic alcohols, poly-oxy-alkylated amines and poly-oxy-alkylated imidazolines. A preferred corrosion inhibitor is N-laurylsarcosine. If present, the amount of corrosion inhibitor used in a thermal insulation composition of this invention is about 0.01% to about 1% and preferably about 0.05% to about 0.1% by weight of the composition.

Optionally, metal sequestrants, or metal chelators, may be present in the thermal insulation fluid of the present invention to provide enhanced stability of the pipeline/insulator system by binding to the metal cations that may be present in the insulation fluid composition. Once bound to the chelator, further reactions of the metal cation with other materials in the insulation fluid are inhibited or prevented. Accordingly, compounds that are useful as metal sequestrants or chelators in the present invention are those compounds or compositions that will form stable complexes with metal ions, and particularly with metal ions that are present in, or could be generated from, materials used in pipeline construction. Examples of useful metal sequestrants (chelators) include, but are not limited to, polyphosphates, e.g., pyrophosphate, metaphosphate; hydroxy acid salts, e.g., sodium citrate, sodium gluconate; aminopolycarboxylic acids, e.g., ethylenediamine tetraacetic acid, nitrilotriacetic acid; hexahydric alcohols, e.g., sorbitol and mannitol. If present, the amount of metal sequestrant used in a thermal insulation composition of this invention is about 0.05% to about 1% and preferably about 0.05% to about 0.2% by weight of the composition.

The rheologically modified insulation fluid compositions of this invention may be prepared by combining at least one of the above-described additives with the rheologically modified polyol composition of this invention. Optionally, co-agents, corrosion inhibitors, and/or metal sequestrants may be added by mixing those additives, neat (as solid powders or as liquids) or in solution, with the dispersed polyol composition. Alternatively, a co-agent may be combined with the reticulated bacterial cellulose prior to dispersion to obtain a well dispersed admixture of the co-agent and reticulated bacterial cellulose in polyol. Solutions of the additives may be prepared by dissolving the additive in water or in a polyol base fluid depending on the solubility characteristics of the additive.

The rheologically modified thermal insulation fluid composition of this invention preferably contains reticulated bacterial cellulose, ethylene glycol or polyethylene glycol and carboxymethyl cellulose or cationic hydroxyethyl cellulose. More preferably, the thermal insulation fluid composition includes reticulated bacterial cellulose, ethylene glycol and carboxymethyl cellulose.

Fluid delivery compositions comprise another embodiment of this invention. These delivery compositions contain particulate materials, or active materials, that are suspended, but not solvated, in the fluid and can thus be delivered or carried by the fluid. These delivery compositions are typically prepared by mixing the particulate material, and any other requisite additives, with the rheologically modified polyol composition of this invention, described above. Polyol base fluids useful in the hydrocolloid delivery fluid composition of this invention are fluids that do not dissolve or solvate the hydrocolloid or other particulate materials to be delivered or carried. An especially useful polyol base fluid is polyethylene glycol (PEG). Preferred polyol base fluids are those polyethylene glycols commercially available under the designation of PEG 200, PEG 300, PEG 400 and the like.

Fluid delivery compositions, containing water-soluble hydrocolloids admixed with the polyol composition of this invention, are useful for metering the hydrocolloids, i.e., food starches, into food processing systems. Generally, the hydrocolloids are commercially available as dry powders, and accurate metering of discrete quantities of such solid powders is often difficult. Formation of the stable viscous, yet fluid dispersions of the hydrocolloids in the rheologically modified polyol composition of the present invention permits the metering of hydrocolloids using common liquid dispensing equipment, e.g., the liquid dispensing equipment at concrete redi-mix plants and the equipment on redi-mix trucks, the liquid process food systems in food and industrial plants, and the like.

The amount of the reticulated bacterial cellulose present in the hydrocolloid delivery fluid composition of this invention is about 0.005% to about 2.0%, by weight of the composition, and preferably 0.005% to about 0.5% by weight. The amount of hydrocolloid particulate materials present in the fluid delivery compositions is about 0.1% to about 60% by weight of the composition. The amount of polyol base fluid used in fluid delivery compositions will vary significantly in these types of compositions because the weight of the particulate material to be delivered in the fluid is application specific. The amount of polyol base fluid present in the composition will be that amount necessary to fluidize the cellulose/hydrocolloid mixture to a desired viscosity. Accordingly, the amount of polyol base fluid used in these compositions may vary from about 40% to about 99.9% by weight of the composition. However, the polyol base fluid will comprise about 95% to 100% of the fluid used in the composition.

In another embodiment of this invention, the rheologically modified polyol composition may be used as a drilling fluid. Drilling fluids are used to clean and cool the drill bit, during drilling operations. Typically, the drilling fluid is pumped through the drill bit to flush rock cuttings, e.g., rock particles and other debris, away from the drill bit and to suspend and transport the rock cuttings to the surface, thereby improving drilling efficiency. The amount of the reticulated bacterial cellulose present in the drilling fluid composition of this invention is about 0.005% to about 2.0% by weight of the composition, and preferably 0.02% to 0.5% by weight of the composition. The amount of polyol base fluid present in the drilling fluid composition is about 90% to about 99.995% by weight of the composition.

The rheologically modified polyol compositions of the present invention are useful to impart enhanced properties to a wide variety of applications, other than those described above. For example, the polyol compositions are useful to impart cling and anti-sag properties to paint and varnish removers, tire sealants, pneumatic shock absorbers, fluid drives, metal working fluids, lubricants, cosmetics, personal care products, and the like. For each application, a rheologically modified fluid composition, comprising an admixture of the polyol composition of this invention having a viscosity appropriate for the specific application and any additives, such as solvents that remove paint or sealant-forming materials, may be applied by spraying, pouring, or pumping onto the surface of the object to be coated. For example, a tire sealant fluid composition may be introduced into a tire to coat and seal the interior surface of the tire, whereas a paint remover fluid composition may be applied on to the painted surface of a chair, door, or object from which paint is to be removed. The enhanced cling and anti-sag properties of the fluid compositions inhibit or substantially prevent the compositions from flowing off the surface of the object or subject that is coated with the composition.

While various uses of and compositions containing the polyol compositions of this invention have been described, this disclosure is not intended to limit the present invention and persons skilled in the art can readily contemplate other applications of, and compositions containing, the polyol compositions of the present invention, all of which are considered within the scope of the present invention. The Examples which follow are intended as an illustration of certain preferred embodiments of the invention, and no limitation of the invention is implied.

EXAMPLE 1

Polyol Composition

Reticulated bacterial cellulose in the wet-cake form was dispersed into polyethylene glycol (PEG 200) using a high rpm (1200 rmp) lightning-style mixer equipped with a disintegrating or saw blade type mixing blade. The mixing continued until all of the wet-cake was visibly dispersed.

The solution was further passed through an extensional homogenizer three times at a pressure of 1500 psi. The extensional homogenizer used was equipped with a 0.5 diameter nozzle at a gap distance of 0.25 mm. The unit contains a dispersion device which includes a nozzle and plate having a defined gap into which a fluid or multicomponent system is forced under pressure. The extensional homogenizer is further described in International Publication No. WO 96/40423, the disclosure of which is incorporated by reference herein. The pressure for this unit was supplied by compressed gas.

The resulting reticulated bacterial cellulose/polyethylene glycol fluid was tested for viscosity at room temperature using a Brookfield DV3 viscometer equipped with a small sample adapter (spindle SC4-14) at 2.5 rpm. The reticulated bacterial cellulose concentration is given as a percent by weight of active material.

TABLE 1

| Concentration | Viscosity (mPas) |
|---|---|
| 0.05 | 160.7 |
| 0.075 | 223.0 |
| 0.10 | 310.1 |
| 0.125 | 364.8 |
| 0.15 | 513.6 |

EXAMPLE 2

Insulating Composition 1

Ethylene glycol (200 ml), wet-cake reticulated bacterial cellulose (5.56 g, 18% by weight solids) and carboxymethyl cellulose (CMC 7L, 6.67 g of a 5 wt % CMC solution in deionized water) were combined in a glass mason jar. The ratio of wet-cake reticulated bacterial cellulose (active):CMC in this example was 3:1. A blender-blade assembly (Oster or Waring), was attached to the mason jar and the mixture was blended at high speed for 10 to 20 minutes. The blended mixture was de-gassed under vacuum.

EXAMPLE 3

Insulating Composition 2

Ethylene glycol (200 ml), wet-cake reticulated bacterial cellulose (5.56 g, 18% by weight solids) and carboxymethyl cellulose (CMC 7L, 0.67 g, a solid powder) were combined in a glass mason jar. The ratio of wet-cake reticulated bacterial cellulose (active):CMC in this example was 2:1. A blender-blade assembly was attached to the mason jar and the mixture was blended at high speed for 10 to 20 minutes. The blended mixture was de-gassed under vacuum.

EXAMPLE 4

Insulating Composition 3

Ethylene glycol (200 ml), dry reticulated bacterial cellulose (2 g, 50% active, 50% corn starch filler) and carboxymethyl cellulose (CMC 7L, 0.5 g) were combined in a glass mason jar. The ratio of active reticulated bacterial cellulose:CMC in this example was 2:1. A blender-blade assembly was attached to the mason jar and the mixture was blended at high speed for 10 to 20 minutes. The blended mixture was de-gassed under vacuum.

High Temperature Stability Test Method

The reticulated bacterial cellulose/ethylene glycol fluid of Insulating Composition 1 (180 ml) was placed in a clear, heat-resistant container. Mild steel corroded coupons were added to the fluid. An approximate gel:metal surface ratio of 6 cm$^3$/cm$^2$ was used. The corroded metal coupons were used to simulate the iron present in a sub-sea insulation pipeline. The remaining volume of the container was purged with a stream of nitrogen and a cover was secured on the container. The container was placed in an oven at 80° C. (176° F.) and observed periodically over a 6 month period. This sample maintained thixotropic properties with no detectable separation of ethylene glycol over the entire 1 year period. Separation of base fluid could lead to formation of convection currents and concomitant loss of insulating properties.

EXAMPLE 5

Hydrocolloid fluid composition

Reticulated bacterial cellulose wet-cake (7.5 g, 18% by weight solids) was mixed with 500 ml polyethylene glycol (PEG 200, Dow Chemical Co., Midland, Mich.) using a Waring Blender for 5 minutes on the "high" setting to provide a viscous, homogeneous dispersion. Welan gum (26 g, sold by Kelco®, a unit of Monsanto, San Diego, Calif.) was slowly added, with mixing at 650 rpm using a propeller type mixer. The resulting suspension of welan gum in reticulated bacterial cellulose/polyethylene glycol was stable and did not settle.

Other variations or modifications, which will be obvious to those skilled in the art, are within the scope and teachings of this invention. This invention is not to be limited except as set forth in the following claims.

We claim:

1. A substantially non-aqueous rheologically modified polyol composition comprising:
    (i) reticulated bacterial cellulose, and
    (ii) ethylene glycol,
        wherein said reticulated bacterial cellulose is present in an amount effective to viscosify the ethylene glycol to substantially reduce flow of the composition.

2. A substantially non-aqueous rheologically modified polyol composition comprising:
    (i) reticulated bacterial cellulose,
    (ii) ethylene glycol, and
    (iii) cationic hydroxyethyl cellulose or carboxymethyl cellulose,
        wherein said reticulated bacterial cellulose is present in an amount effective to viscosity the ethylene glycol to substantially reduce flow of the composition, wherein said cationic hydroxyethyl cellulose or carboxymethyl cellulose are present in an amount of about 0.05% to about 1% by weight of the composition.

3. A method for de-icing a surface of a substrate, said method comprising the step of:
    applying, to the surface of the substrate, a substantially non-aqueous rheologically modified composition comprising reticulated bacterial cellulose and a polyol base fluid, wherein said reticulated bacterial cellulose is present in an amount effective to viscosity the polyol base fluid to substantially reduce the flow of the composition, wherein said polyol base fluid is selected from the group consisting of glycols, polyglycols and polyhydric alcohols.

4. A method of using a rheologically modified polyol composition as a drilling fluid comprising:
    pumping, through a drill bit, a substantially non-aqueous rheologically modified polyol composition comprising reticulated bacterial cellulose and a polyol base fluid, wherein said reticulated bacterial cellulose is present in a concentration of about 0.005% to about 2.0% by weight of the composition, wherein said polyol base fluid is selected from the group consisting of glycols, polyglycols and polyhydric alcohols.

5. A method of using a rheologically modified composition as an anti-sag agent comprising:
    applying to a surface of a substrate a substantially non-aqueous rheologically modified polyol composition comprising reticulated bacterial cellulose and a polyol base fluid, wherein said reticulated bacterial cellulose is present in an amount effective to viscosify the polyol base fluid to substantially prevent the composition from flowing off the surface of the substrate, wherein said polyol base fluid is selected from the group consisting of glycols, polyglycols and polyhydric alcohols.

6. A substantially non-aqueous rheologically modified thermal insulation fluid composition comprising:
    (i) a reticulated bacterial cellulose,
    (ii) a polyol base fluid,
    (iii) at least one co-agent, and
    (iv) a corrosion inhibitor,
        wherein said reticulated bacterial cellulose is present in an amount effective to viscosity the base fluid to substantially reduce convection flow in the composition, wherein said polyol base fluid is selected from the group consisting of glycols, polyglycols and polyhydric alcohols, said co-agent is a water soluble cellulosic material present in the composition in an amount of about 0.05% to about 1% by weight of the composition, and said corrosion inhibitor is present in the composition in an amount of about 0.01% to about 1% by weight of the composition.

7. A composition according to claim 6, further comprising a metal sequestrant, wherein said sequestrant is a compound or composition that will form a stable complex with a metal ion and is present in an amount of about 0.05% to about 1% by weight of the composition.

8. A method of thermally insulating a fluid transport member comprising the step of:
    surrounding an outer surface of the fluid transport member with a substantially non-aqueous rheologically modified polyol composition comprising reticulated bacterial cellulose and a polyol base fluid, wherein said reticulated bacterial cellulose is present in an amount effective to viscosity the polyol base fluid to substantially reduce convection flow in the composition, wherein said polyol base fluid is selected from the group consisting of glycols, polyglycols and polyhydric alcohols.

9. A method according to claim 8, wherein said polyol composition further comprises at least one co-agent and a corrosion inhibitor, wherein said co-agent is a water soluble cellulosic material present in an amount of about 0.05% to about 1% by weight of the composition, said corrosion inhibitor is selected from the group consisting of surfactants, triethanolamine, fatty diamines, phosphonates, acetylenic alcohols, poly-oxy-alkylated amines, and poly-oxy-alkylated imidazolidines, and said corrosion inhibitor is present in the composition in an amount of about 0.01% to about 1% by weight of the composition.

10. A substantially non-aqueous hydrocolloid delivery fluid composition comprising:
    (i) a reticulated bacterial cellulose,
    (ii) a polyol base fluid, and
    (iii) a hydrocolloid,
        wherein said reticulated bacterial cellulose is present in an amount effective to suspend the hydrocolloid in the fluid composition, wherein said polyol base fluid is selected from the group consisting of glycols, polyglycols and polyhydric alcohols and said hydrocolloid is present in an amount of about 0.1% to about 60% by weight of the composition.

11. A method of suspending a hydrocolloid in a fluid composition comprising the step of:
    adding the hydrocolloid to a substantially non-aqueous rheologically modified polyol composition comprising reticulated bacterial cellulose and a polyol base fluid, wherein said reticulated bacterial cellulose is present in an amount effective to suspend the hydrocolloid in the fluid composition, wherein said polyol base fluid is selected from the group consisting of glycols, polyglycols and polyhydric alcohols.

12. A composition according to claim 10, wherein the hydrocolloid is a water soluble hydrocolloid material.

13. The composition according to claims 1 or 2, wherein ethylene glycol is present in an amount of about 50% to about 99.995% by weight of the composition.

14. The method according to any one of claims 3–5, 8, 9 or 11, wherein said polyol base fluid is present in said substantially non-aqueous rheologically modified composition in an amount of about 50% to about 99.995% by weight of the composition.

15. The composition according to claims 6 or 7, wherein said polyol base fluid is present in said composition in an amount of about 50% to about 99.995% by weight of the composition.

16. The composition according to claims 10 or 12, wherein said polyol base fluid is present in said composition in an amount of about 40% to about 99.995% by weight of the composition.

* * * * *

UNITED STATES PATENT AND TRADEMARK OFFICE
CERTIFICATE OF CORRECTION

PATENT NO. : 5,951,910

DATED : September 14, 1999

INVENTOR(S) : C. BRYAN SKAGGS ET AL.

Page 1 of 2

It is certified that error appears in the above-identified patent and that said Letters Patent is hereby corrected as shown below:

<u>COLUMN 1</u>

Line 38, "Theologically" should read --rheologically--.

<u>COLUMN 2</u>

Line 23, "water" should read --water- --.

<u>COLUMN 3</u>

Line 3, "cross sectional" should read --cross-sectional--;
   Line 23, "water soluble" should read --water-soluble--.

<u>COLUMN 6</u>

Line 52, "viscosity" should read --viscosify--.

<u>COLUMN 11</u>

Line 46, "viscosity" should read --viscosify--.

<u>COLUMN 12</u>

Line 12, "viscosity" should read --viscosify--;
   Line 17, "water soluble" should read --water-soluble--;
   Line 35, "viscosity" should read --viscosify--;
   Line 42, "water soluble" should read --water-soluble--.

UNITED STATES PATENT AND TRADEMARK OFFICE
CERTIFICATE OF CORRECTION

PATENT NO. : 5,951,910

DATED : September 14, 1999

INVENTOR(S) : C. BRYAN SKAGGS ET AL.

It is certified that error appears in the above-identified patent and that said Letters Patent is hereby corrected as shown below:

COLUMN 13

Line 8, "water soluble" should read --water-soluble--.

Signed and Sealed this

Eighth Day of May, 2001

Attest:

NICHOLAS P. GODICI

Attesting Officer

Acting Director of the United States Patent and Trademark Office